United States Patent
Xiao et al.

(10) Patent No.: US 9,014,452 B2
(45) Date of Patent: Apr. 21, 2015

(54) ORIENTATION-AWARE AVERAGE INTENSITY HISTOGRAM TO INDICATE OBJECT BOUNDARY DEPTH IN ULTRASOUND IMAGES

(71) Applicant: Seiko Epson Corporation, Tokyo (JP)

(72) Inventors: Jing Xiao, Cupertino, CA (US); Chenyu Wu, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 80 days.

(21) Appl. No.: 13/971,912

(22) Filed: Aug. 21, 2013

(65) Prior Publication Data

US 2015/0055841 A1    Feb. 26, 2015

(51) Int. Cl.
*G06K 9/00* (2006.01)
*G06T 7/00* (2006.01)
*G06K 9/46* (2006.01)

(52) U.S. Cl.
CPC ............ *G06T 7/0012* (2013.01); *G06T 7/0085* (2013.01); *G06T 7/0051* (2013.01); *G06K 9/4647* (2013.01)

(58) Field of Classification Search
CPC ... G06T 7/0012; G06T 7/0085; G06K 9/4647
USPC ........................................................ 382/131
See application file for complete search history.

(56) References Cited

U.S. PATENT DOCUMENTS

| | | | |
|---|---|---|---|
| 7,004,904 B2 | 2/2006 | Chalana et al. | |
| 7,499,578 B2 * | 3/2009 | Reeves et al. | 382/131 |
| 7,736,313 B2 * | 6/2010 | Luo et al. | 600/437 |
| 8,771,191 B2 * | 7/2014 | Fritz et al. | 600/449 |
| 2012/0226152 A1 | 9/2012 | Porikli | |

FOREIGN PATENT DOCUMENTS

EP    1531730    5/2005

OTHER PUBLICATIONS

Histograms of Oriented Gradients for Human Detection, Navneet Dalal and Bill Triggs, INRIA Rhone—ALPS, Computer Vision and Pattern Recognition, 2005, CVPR2005, IEEE Computer Conference, vol. 1, France.
Rapid Image Stitching and Computer-Aided Detection for Multipass Automated Breast Ultrasound, Ruey-Feng Chang, Kuang-Che Chang-Chien, Etsuo Takada, Chiun-Sheng Huang, Yi-Hong CHou, Chenming Kuo, Jeon-Hor Chen, May 2010, (pp. 1-11).

* cited by examiner

*Primary Examiner* — Gregory M Desire (57) ABSTRACT

Linear candidate lines at different angles are used to determine an average intensity for each pixel level of an ultrasound image. The resultant average intensities are collected into a histogram, and the histogram is used to determine the depth positions of tissue boundary lines within an ultrasound image.

20 Claims, 8 Drawing Sheets

ORIENTATION-AWARE AVERAGE INTENSITY HISTOGRAM TO INDICATE OBJECT BOUNDARY DEPTH IN ULTRASOUND IMAGES

BACKGROUND

1. Field of Invention

The present invention relates to the field of ultrasound imaging. More specifically, it relates to detecting the depths of inter-tissue boundaries within an ultrasound image.

2. Description of Related Art

Ultrasound imaging refers to the imaging of structures below a subject's surface (such as the imaging of internal human organs below a skin surface) by the sending of sound waves of known frequency into the interior of the subject and observing any sound waves that bounce back. By monitoring how long it takes for sound waves to bounce back from an internal structure, it is possible to estimate the depth and shape of the structure within the subject. It is also possible to discern some characteristics about the internal structure based on how the sound waves are absorbed, dispersed or deflected.

Ultrasonography, or diagnostic sonography, refers to the use of ultrasound imaging techniques for imaging subcutaneous body structures, or tissues, for diagnostic purposes. Ultrasound imaging may be used to image various types of tissues, such as muscle, fat, tendons, vessels, internal organs, etc. Another example is obstetric sonography, which is used to image a developing baby during pregnancy.

Ultrasound imaging typically applies a series of ultrasound waves at a frequency above the human audible range, and observed the sound waves that bounce back. Each sound wave is observed separately and constitutes a scan signal, or a scan line of an image. The collection of observed sound waves, or scan lines or scan signals, are placed sequentially next to each other to construct a two-dimensional image in a manner similar to how images are created in a cathode ray tube.

A problem with ultrasound images is that they are typically very noisy, due in part to the great many tissues and fluids of differing densities and types encountered by a sound wave as it propagates and dissipates through its downward and upward paths through an observed body.

Another problem with ultrasound images is that they are constructed by moving an ultrasound wand over the surface of a target tissue area, but the resultant ultrasound image formed from one pass of the ultrasound wand is typically very narrow. This provides a user (i.e., an ultrasound technician) with only a small observable part (or swatch or slice) of the whole of the target tissue area. As a result, multiple swatches are typically needed to gather enough imaging information to span the whole of the target area. That is, a technician must make multiple passes with the ultrasound wand along different paths, store the image information from each pass, and try to put together the image information from the different passes.

The ability to stitch together multiple ultrasound images from multiple passes to create one larger ultra sound image is therefore beneficial. To stitch images together refers to the combining of image information from two or more images as seamlessly as possible/practical.

There are several examples of stitching ultrasound images. One example is found in European patent EP1531730A1 to Chin et al, which describes the stitching of multiple ultrasound images to construct a composite whole to aid in the diagnosis of breast cancer. Another example is provided in "Rapid Image Stitching and Computer-Aided Detection for Multipass Automated Breast Ultrasound", *Med. Phys.* 37 (5), May 2010, by Chang et al., which describes using the sum of absolute block-mean difference (SBMD) measure to stitch ultrasound images.

In general, image stitching requires two more adjacent images having some overlapping portion. Characteristic features of each image (at least within their overlapping portions) are identified and described. The distinctive descriptions of the characteristic features in one image are then compared with those of its adjacent image to identify characteristic features that may correspond to each other (and thus correspond to the same point on an imaged scene). Characteristic features that correspond to each other may be said to be "indexed" or "correlated" to each other. In this manner, an index of corresponding (i.e. matched or correlated) characteristic features in the overlapping portions can be established. This indexing is then used to align and stitch together the two images.

After one has a good ultrasound image (either a singular ultrasound image or a composite of multiple stitched ultrasound images), the next task is to discern medical information from the dark, noisy image. On important piece of information that often needs to be extracted from ultrasound images is to the boundary depth (or boundary line) of different tissue types. Since an ultrasound image typically provides only a small view (or swatch), a full object will likely not be imaged since it would not fit within the swatch. Nonetheless, boundary localization of objects (or of different types of tissues) within an ultrasound image is important since they determination of the boundary depths (i.e. the depth at which a boundary line dividing two different tissue types is found). The boundary depths are useful in the measuring of object, or tissue, layers, such as for fat and/or muscle measurements. Being able to accurately measure fat/muscle layers is important for obesity control, fitness, and other health-related diagnoses.

Identifying these boundary lines, however, is challenging due to ultrasound images being highly noisy. Further complicating matters is that fat and muscle boundaries can be at various depths across different people. The identification of boundary lines is further complicated due to the shapes and image texture of fat and muscle boundaries both being highly variable.

Therefore, determination of boundary lines is typically left to well-trained technicians with much experience in this field. However, it would be helpful if the localization of tissue boundaries within an ultrasound image could be automated to reduce reliance on specialized technicians.

It is therefore an object of the present invention to provide a method to automatically identify tissue boundary lines within an ultrasound image.

It is a second object of the present invention to provide a method to automatically identify multiple boundaries lines of irregular shapes within an ultrasound image.

It a further object of the present invention to be able to identify boundary lines that delineate the boundary between fatty tissues and muscle tissues.

SUMMARY OF INVENTION

The above objects are met in a method/mechanism/system of identifying candidate inter-tissue boundary lines in an ultrasound image, comprising: accessing an input ultrasound image, the input ultrasound image including rows and columns of pixels; identifying candidate boundary lines by: (a) dividing the input ultrasound image into discrete, sequential depth positions, each discrete depth position being defined by a fixed number of rows of pixels; (b) defining a plurality of horizontal band regions, each horizontal band region corresponding to a separate one of the discrete depth positions and fully encompassing its corresponding depth position, each horizontal band region spanning a plurality of sequential depth positions; (c) progressing, one discrete depth position at a time, along the input ultrasound image, and at each, current, depth position executing the following steps: (i) defining a plurality of potential boundary lines within the current horizontal band region that corresponds to the current depth position, each of the defined potential boundary lines traversing a common point within the current horizontal band at a different angle relative to the horizontal; (ii) defining a candidate band region corresponding to each potential boundary line following the trajectory of its corresponding boundary line and encompassing its corresponding boundary line; (iii) determining an intensity value for each potential boundary line based at least in part on the intensity of pixels within its corresponding candidate boundary region; (iv) recording the potential boundary line of highest intensity value as the candidate line for the current depth position; (d) collecting the intensity values of candidate lines recorded at the different depth positions into an intensity-depth histogram; (e) identifying as the candidate inter-tissue boundary lines the candidate lines that substantially correspond to peaks in the intensity-depth histogram.

Preferably in step (a), each discrete depth position is comprised of one row of pixels.

Additionally in step (b), the depth position of each horizontal band defines the middle of the horizontal band.

Furthermore in step (c), the progression of discrete depth positions is along one column of pixels of the input ultrasound image. Also in step (i), the common point is a pixel on the one column. Preferably, the one column is the middle column of the input ultrasound image.

Preferably in step (i), each of the potential boundary lines is a straight line.

Further preferably in step (i), the common point is the center of the current horizontal band.

Additionally in step (ii), the length of each candidate band is defined by the length of its corresponding potential boundary line to traverse from one side of the current horizontal band to its opposing side, and the width of each candidate band is defined by the pixel-width of its corresponding potential boundary line. In this case, the one side and its opposing side may be opposite sides along the horizontal direction of the horizontal band.

Also in step (iii), the intensity value for each potential boundary line is determined by the average intensity of the pixels along the boundary line. Preferably, the intensity value for each potential boundary line is further weighted by the cosine of the angle of the potential boundary line relative to the horizontal direction defined by the horizontal band.

Preferably in step (ii), the length of each candidate band is defined by the length of its corresponding potential boundary line to traverse from one side of the current horizontal band to its opposing side, and the width of each candidate band is multiple times the pixel-width of its corresponding potential boundary line.

Additionally in step (ii), each potential boundary line bisects its corresponding candidate band region into two equal parts.

Preferably in step (iii), the intensity value for each potential boundary line is determined by the mean of the pixel intensities within its corresponding candidate band. In this case, in step (iii), the intensity value of each potential boundary line may further be determined by the variance of the pixel intensities within its corresponding candidate band. Further preferably, identified outliers in the distribution of mean and variance values are not considered.

Additionally in step (iii), when calculating the mean intensity of the pixel intensities within its corresponding candidate band, the intensity of each pixel is weighted by its distance to the candidate band's corresponding potential boundary line, where the farther the distance of a pixel to the potential boundary line, the smaller its weight. The weight may be defined as:

$$\text{Weight} = e^{(-d^2/\text{sigma}^2)}.$$

where "d" is the a respective pixel's distance to the corresponding potential boundary line, and "sigma" is defined by the distribution of mean values.

Further preferably, the weighted mean intensity is again weighted by the cosine of angle $\theta$ of the candidate band relative to the horizontal direction of the horizontal band.

The above objects may also be met in a method/mechanism/system of defining and characterizing candidate boundary lines in an ultrasound image. This reduces the number of possible boundary lines for consideration.

The preferred method of defining candidate boundary lines makes use of an orientation-aware average intensity histogram (i.e. OAAIH). The method begins by moving down the middle of an ultrasound image one depth position at time (i.e. a depth position may be defined by a row of pixels so that one moves downwards one pixel at a time, i.e. pixel-row by pixel-row). At each depth position (i.e. at each pixel-row), the average brightness intensities along different linear directions within a band region (i.e. within a specified number of pixel-rows) are checked, and the linear direction with the highest average intensity for that depth position is recorded. The recorded linear directions of highest intensity for each depth position are collected into an intensity-depth histogram. The histogram may also include the intensity distribution in each band, where pixels closer to the center of the recorded linear direction of maximum intensity within the given band are given a higher weight than pixels farther from this linear direction. The average intensity of the linear direction of maximum intensity is also weighted by cosine of the angle $\theta$ relative to a defined horizontal base-line reference.

Each linear direction of maximum intensity at each depth position is preferably characterized by eleven metrics, defined: (1) Weighted average intensity (OAAIH value) at the peak; (2) OAAIH peak value divided by the maximum OAAIH value across all depth positions; (3) OAAIH peak value divided by the sum of the OAAIH values across all depth positions; (4) OAAIH peak value divided by the mean of the OAAIH peaks that are deeper; (5) Depth position of the OAAIH peak; (6) Distance to the second highest peak divided by the distance between the first and second highest peaks; (7) Absolute value of the 6th feature; (8) First and second order gradients at the OAAIH peak across a number of scales; (9) Gradients divided by the maximum OAAIH value; (10) Gradients divided by the sum of the OAAIH values; and (11) Detected slanting angle with maximum weighted average intensity at the peak position. The identified candidate boundary lines may then be compared with model boundary lines to identifying fatty tissue and muscle tissue. The present invention appears patentable over the found prior art.

The above method is also met in a method/mechanism/system of identifying instances of tissue boundary lines in an ultrasound image, comprising: accessing an input ultrasound image, the input ultrasound image including rows and columns of pixels; identifying potential tissue boundary lines by apply: (a) dividing the input ultrasound image into discrete depth positions, each discrete depth position being defined by a fixed number of rows of pixels; (b) defining a plurality of band regions, each band region corresponding to a separate one of the discrete depth positions, each band region comprising a plurality of rows of pixels and overlapping its corresponding discrete depth position; (c) progressing, one discrete depth position at a time, along one column of pixels of the input ultrasound image, and at each discrete depth position executing the following steps: (i) determining the average pixel intensities along different linear directions within the band region corresponding to the current discrete depth position; (ii) identifying the linear direction of highest average intensity within the current band region; (d) collecting the recorded linear directions of highest intensity into an intensity-depth histogram; (e) identifying candidate linear directions from the intensity-depth histogram, the number of identified candidate linear directions being smaller than the total number of recorded linear directions collected into the intensity-depth histogram; (f) comparing only the candidate linear directions to models of tissue boundary lines to identify the instances of tissue boundary lines from among the candidate lines directions.

Preferably, each recorded linear direction of highest average intensity is further characterized by at least one of the following parameters: a weighted average intensity at its peak; the intensity-depth histogram peak value divided by the maximum intensity-depth histogram value across all depth positions; intensity-depth histogram peak value divided by the sum of the intensity-depth histogram values across all depth positions; intensity-depth histogram peak value divided by the mean of the intensity-depth histogram peaks that are deeper; depth position of the intensity-depth histogram peak; distance to its second highest peak divided by the distance between the first and second highest peaks; the first and second order gradients at the intensity-depth histogram peak across a number of scales; gradients divided by the maximum intensity-depth histogram value; gradients divided by the sum of the intensity-depth histogram values; and detected slanting angle with maximum weighted average intensity at the peak position.

Further preferably, each discrete depth position is wholly encompassed within its corresponding band region. In this case, each discrete depth position is comprised one row of pixels.

Additionally in step (d), it is preferred that the intensity-depth histogram further includes the intensity distribution in each band region, wherein within each band region pixels closer to the center of the band region's identified linear direction of highest average intensity are given are given a higher weight than pixels farther from this linear direction of highest average intensity.

Preferably in step (d), the average intensity of the identified linear direction of highest average intensity is further weighted by the cosine of the angle it makes relative to a defined base-line reference.

Additionally in step (e), the identified candidate linear directions correspond to peak regions of the intensity-depth histogram.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Measuring object boundary depths, such as the boundary depth of a fat layer (or fatty tissue layer) and/or the boundary depth of a muscle layer (or muscle tissue layer) using ultrasound images is important for health care, medical diagnosis, obesity control, general fitness, etc. Boundary localization of objects, or of different tissue types, within ultrasound images is important for determination of the boundary depth of tissue layers.

Identifying these boundary depths, however, is challenging due to ultrasound images being highly noisy. Further complicating matters is that fat and muscle boundaries can be at various depths and shapes across different people. The identification of boundary lines is further complicated due to the shapes and image texture of fat and muscle boundaries both being highly variable.

Figure 1:
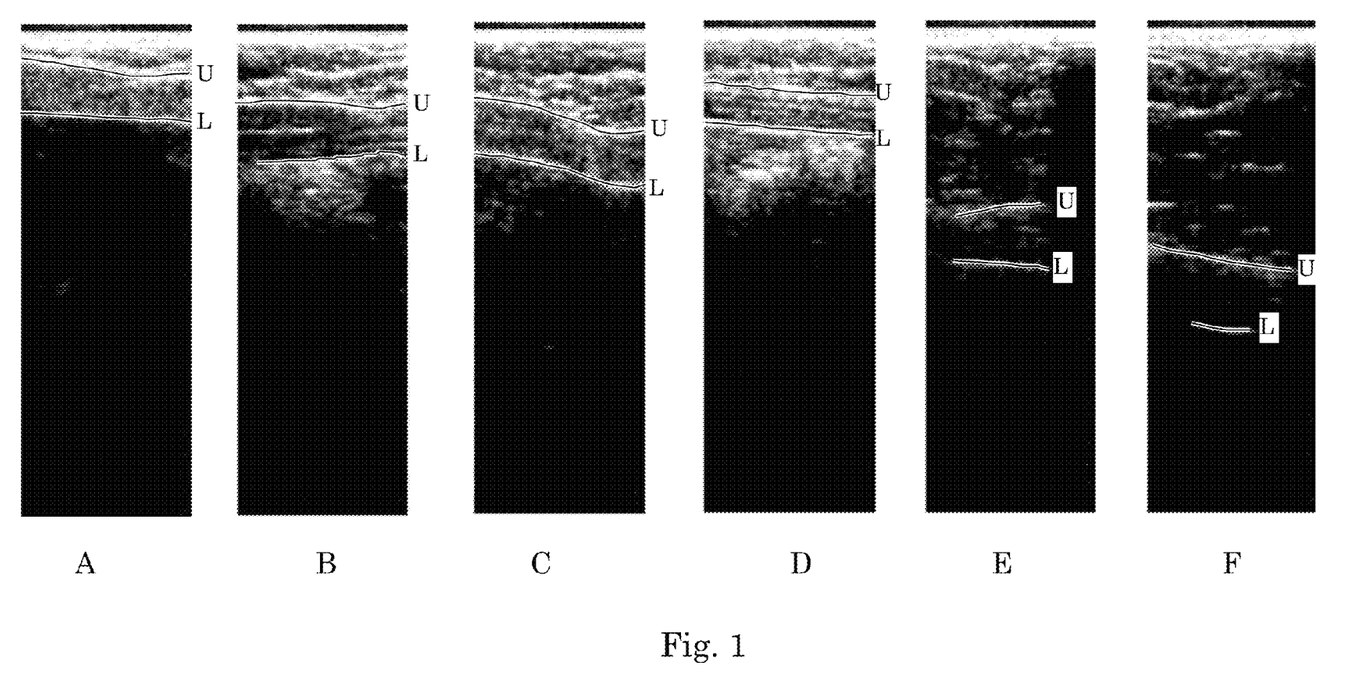
FIG. 1 provides multiple examples A, B, C, D, E, and F of ultrasound images of an abdominal area.

FIG. 1 provides multiple examples A, B, C, D, E, and F of ultrasound images of an abdominal area. Bright pixels typically delineate the boundary regions between tissue types. So to find a boundary, one would look for elongated bright strips within an ultrasound image. An ultrasound image, however, typically has several elongated bright and dark regions so identifying a desired boundary line is not a straight forward issue. Each sample ultrasound image shows two boundary lines at different depths, and in each ultrasound image, the lower boundary line (labeled L in each sample image) is a muscle boundary line, and upper boundary line (labeled U in each sample image) is a fat boundary line. As illustrated, boundary lines may have irregular shapes that slant down across an ultrasound image. As is emphasized by samples E and F, sometimes only a partial boundary line is discernable within an ultrasound image.

Because tissue boundary lines typically show up as bright areas separating two darker areas within an ultrasound image, one method of determining a boundary depth (i.e. the depth at which a boundary line is found) is by means of an Average Intensity Histogram (AIH). An AIH creates a histogram of the average intensity of each horizontal row of pixels as one traverses downward (one-pixel-row at a time) through an ultrasound image.

Figure 2:
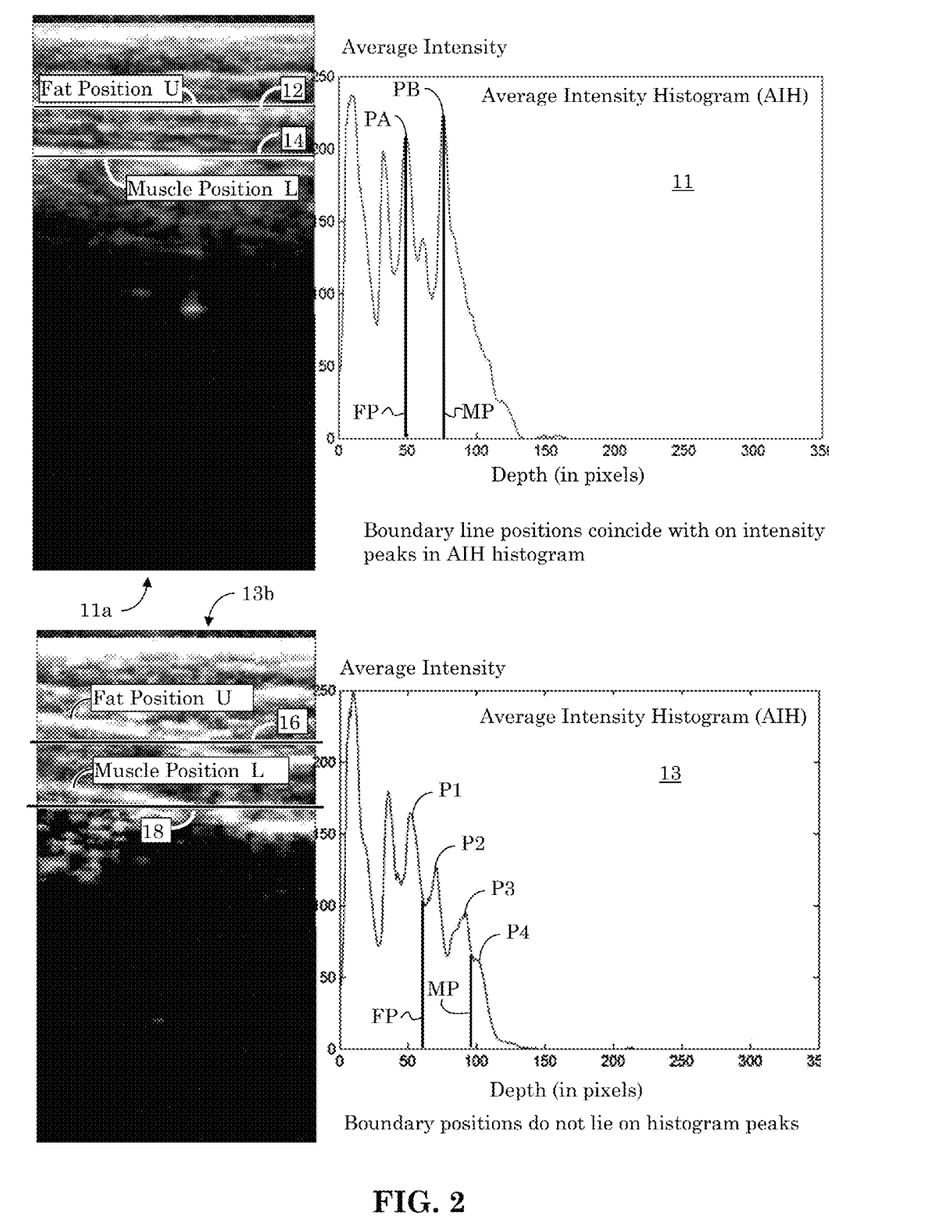
FIG. 2 illustrates two examples of Average Intensity Histograms, AIH, each constructed from a corresponding ultrasound image.

FIG. 2 illustrates two examples of Average Intensity Histograms, 11 and 13, each constructed from a corresponding ultrasound image 11a and 13a. To construct an AIH, at each depth position (i.e. pixel row), the average of the intensity of all pixels in that row is calculated, and this average value represents the histogram value at that given depth. The ordinate (i.e. the vertical axis) of each AIH histogram lists average intensity values, and the abscissa (i.e. the horizontal axis) corresponds to the depth values of the corresponding ultrasound image. Thus, the peaks and valleys of the AIH histogram correspond to bright and dark spots in the average intensity values of rows within the ultrasound image.

In each of histogram 11a and 13a, the upper boundary line U corresponds to the fat depth position, and the lower boundary line L corresponds to the muscle depth position. It is noted that in histogram 11a, boundary lines U and L are mostly horizontal, which corresponds well to taking intensity average of each horizontal row of pixels. That is, horizontal row 12, which is substantially at the same depth position as fat position depth U follows the path of the fat boundary line, and horizontal row 14, which is substantially at the same depth position as muscle position depth L follows the path of the muscle boundary line. As a result, the intensity peaks in AIH 11 correspond well with the depth position of the fat boundary line (labeled FP) in AIH 11 and with the depth position of the muscle boundary line (labledMP). In this case, the peaks of AIH 11 are a good indicator of the depth positions of the fat and muscle boundary lines of ultrasound image 11a. But this is not the case in ultrasound image 13b.

In ultrasound image 11b, boundary lines U and L are curved and slant across the ultrasound image in a diagonal direction relative to the horizontal direction. In this case, the bright pixels of the fat boundary line U and the muscle boundary line L do not match up well with horizontal pixels lines 16 and 18, and thus do not match up well with taking the average intensity of horizontal rows of pixels at each depth position. As result, neither the fat depth position FP or the muscle depth position MP coincide with an intensity peak in AIH 13. Thus, in this case, the peaks of AIH 13 are not a good indicator of where the boundary depth positions may be found.

Ideally, the depth boundaries should coincide with an intensity peak in the Average Intensity Histogram in order to locate its depth. For example in AIH 11, line FP corresponds to intensity peak PA at depth position 50, and it correctly identifies the fat depth position of the fat boundary line U in ultrasound image 11a. Similarly in AIH 11, lines MP corresponds to intensity peak PB at a depth of about 75, and it correctly identifies the muscle depth position of the muscle boundary line L in ultrasound image 11a.

Unfortunately, this approach does not work when the boundary lines are not substantially horizontal, as is illustrated by AIH 13. That is, slanted tissue boundaries may not be located on the histogram peaks of an AIH. In the case of AIH 13, fat position boundary line FP is located between intensity peaks P1 and P2, and muscle position boundary line MP is located between intensity peaks P3 and P4. Thus, AIH 13 would not be suitable for determining the positions of FP and MP.

The present invention proposes to redefine the Average Intensity Histogram by considering an expanded list of possible boundary lines along different directions at each depth position. That is, the present invention provides a novel method of defining and characterizing candidate boundary lines in an ultrasound image such that the boundary line consistently, substantially corresponds to a peak in an intensity histogram. Since only the boundary lines that substantially coincide with intensity peaks in the histogram are likely to correspond to a tissue boundary line, this greatly reduces the number of possible boundary lines for consideration.

The novel method of defining candidate boundary lines makes use of what is herein termed an "Orientation-Aware Average Intensity Histogram" (i.e. OAAIH). The method begins by moving down the middle of an ultrasound image one depth position at time, where a depth position may be defined by a row of pixels so that one moves down the ultrasound image one pixel-row at a time). It is to be understood that one may move down along other pixel positions besides the middle, and that multiple positions may be separately considered (as described below) and their results combined (i.e. averaged). But the presently preferred embodiment considers only one position per depth position, and preferably considers the middle of each depth position row (i.e. each pixel row).

In one embodiment of the present invention, at each depth position, the average intensities along different linear directions within a (preferably horizontal) band region (i.e. within a specified number of pixel-rows) are checked, and the linear direction with the highest average intensity for that depth position is recorded. The recorded linear directions of highest intensity for each depth position are collected into the OAAIH histogram.

Figure 3:
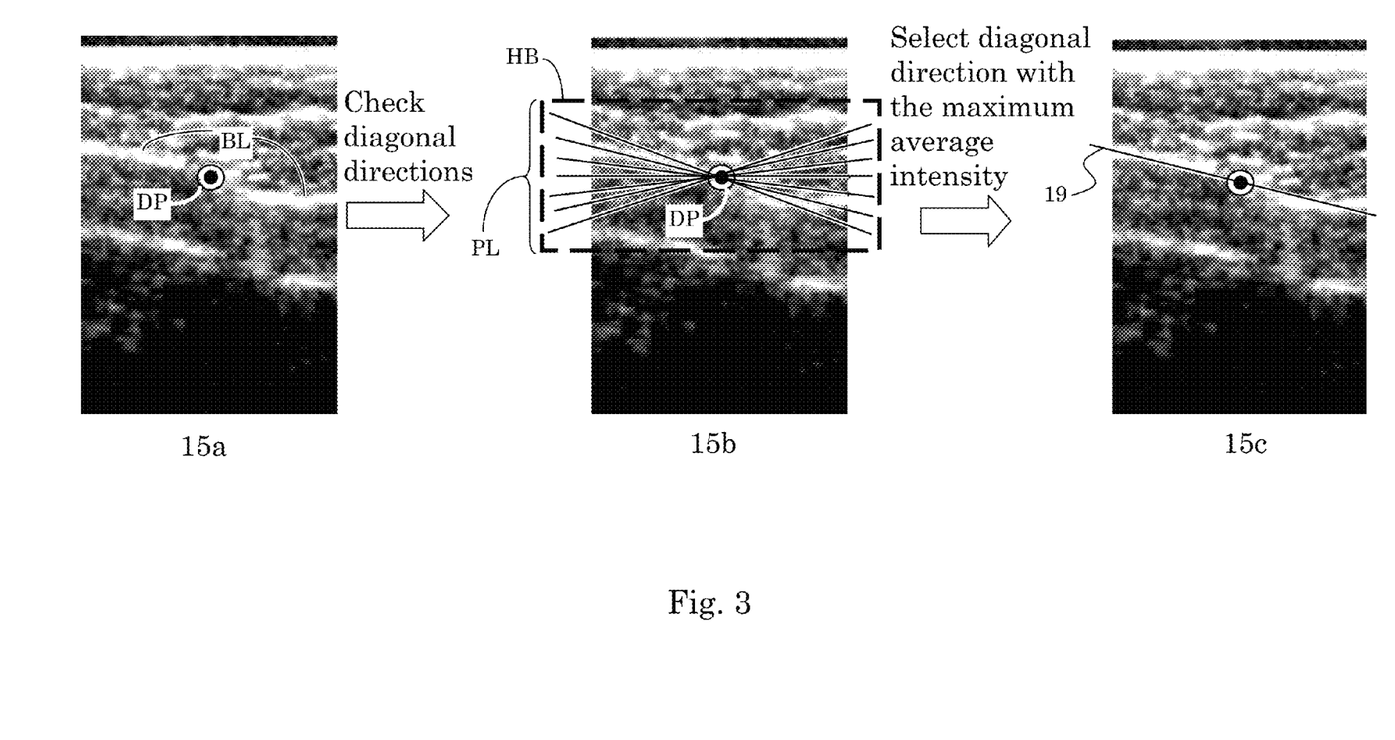
FIG. 3 illustrates how an intensity value at each depth step on an ultrasound image is determinate for the construction of an Orientation-Aware Average Intensity Histogram, OAAIH.

FIG. 3 illustrates how an intensity value for each depth position of an OAAIH is determined in accord with the present embodiment. Ultrasound image 15a shows one depth position DP that corresponds to a diagonal and curved boundary line BL. Ultrasound image 15b shows multiple potential boundary lines PL, each traversing depth position DP at different direction within a horizontal band HB. One of the potential boundary lines PL is selected as the candidate line (CL) corresponding to depth position DP. The average intensity of pixels along each of the potential boundary line PL is calculated. That is, in the present approach, at each depth position DP, the average intensities along different linear directions PL is checked, and the potential boundary line PL with the maximum average intensity is deemed the candidate line for the current depth position and recorded into the present OAAIH histogram (or an intensity chart). In this manner, the present OAAIH is not limited to only horizontal lines. In the present example, potential boundary line 19 (shown in ultrasound image 15c) is selected as the candidate line for depth position DP, since its line path corresponds to the pixels in ultrasound image 15c that have the highest average intensity among all the potential boundary lines PL within horizontal region HB.

Using the approach of FIG. 3, wherein one potential boundary line is selected as the candidate line based on the average pixel intensity along that potential boundary line. This approach works better than the above-described method of forming an AIH using only horizontal potential boundary lines. The preferred embodiment, however, expands on the present embodiment to better account for curvatures in the true boundary line of the ultrasound image, and thus improved the present OAAIH.

Figure 4:
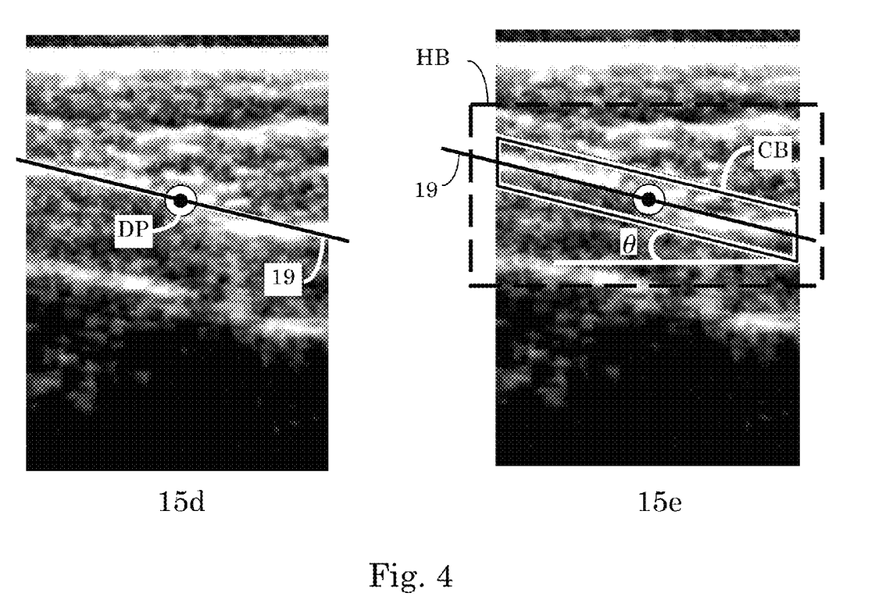
FIG. 4 illustrates an improvement over the method of FIG. 3 for determining intensity values at each depth step on an ultrasound image for the construction of an OAAIH.

With reference to FIG. 4, the preferred embodiment defines a candidate band region CB around each potential boundary line 19, such as the potential boundary lines PL within horizontal band HB shown in ultrasound image 15b of FIG. 3. The preferred embodiment further calculates an intensity value for each potential boundary line PL based on the intensity distribution of pixels within its respective candidate band CB.

For ease of discussion, FIG. 4 illustrates the present process as applied to potential boundary line 19, but it is to be understood that the present processes would be separately applied to each potential boundary line PL within each horizontal band HB that defines each depth step down an ultrasound image.

It is noted that candidate band CB is not necessarily horizontal, but rather follows the orientation of its respective potential boundary line 19. If a potential boundary line 19 is diagonal, its newly defined candidate band CB is also diagonal and follows the orientation of potential boundary line 19. That is, each potential boundary line 19 bisect down the middle of its corresponding candidate band CB, and the intensity value for that potential boundary line is not based sole on the pixels along that potential boundary line, but rather is based on all the pixels within its candidate region CB. For each depth step, potential boundary line PL with the highest intensity value (based on the pixels within its corresponding candidate band CB) is selected as the candidate line for that depth position.

Thus, this alternate OAAIH histogram may thereby include the intensity distribution of the candidate region CB that surrounds each candidate line 19, where pixels within candidate band CB that are closer to its corresponding candidate line 19 (i.e. closer to the center of the recorded linear direction of maximum intensity) are given a higher weight than pixels farther from this linear direction. The average intensity of the linear direction of maximum intensity is also weighted by the cosine of the angle θ relative to a defined horizontal base-line reference (i.e. relative to a pixel row).

As is stated above, although FIG. 4 shows candidate line 19 (i.e. the boundary line with highest average pixel intensity) of ultrasound image 15c of FIG. 3, the present method is applied to each of potential boundary lines PL (see ultrasound image 15b), in turn. A key difference between the approach of FIG. 4 and that of FIG. 3, is that (as is shown in ultrasound image 15e), the present approach defines a candidate band CB around each potential boundary line (with the potential boundary line bisecting its respective candidate band region along its center), and determines an intensity value for that potential boundary line based on the average, variance, and distance to the candidate line of all the pixels within its corresponding candidate band CB, plus the cosine of the angle θ of the candidate band area (i.e. the cosine of the current potential boundary line) with respect to the horizontal axis. That is, a weighted average intensity is calculated for each candidate band region, and highest weighted averaged intensities at the different depth positions are used construct the OAAIH.

This preferred process improves the robustness against noise and an irregular signal strength distribution in an ultrasound image. In this approach, along each linear direction within a horizontal band HB (i.e. along each potential boundary line), one considers not only pixels on the potential boundary line but also considers the pixels within its candidate band CB. The mean and variance of the pixel intensities in the candidate band CB are calculated and the outliers not belonging to this distribution are not considered. Various methods of identifying and rejecting outliers are known in the art, such RANSAC, and the specific method of identifying outliers is not critical to the present invention.

When calculating the average intensity of the remaining pixels within the candidate band CB, the intensity of each pixel is weighted by its distance to the candidate band's center (i.e. to its corresponding potential boundary line), to minimize the bias by occasional small bright spots away from the center. The farther the distance of a pixel to the potential boundary line, the smaller its weight. Preferably, the weight is defined as Weight=e^(−distance²/sigma²). Finally the weighted average intensity is again weighted by the cosine of its slanting angle θ, relative to the horizontal. The purpose of incorporating the cosine of angle θ into the weight calculation is to somewhat favor the horizontal direction rather than slanted (i.e. diagonal) directions.

In the present invention, the inter-tissue boundary depths within an ultrasound image substantially correspond to peaks in the resultant OAAIH. That is, the candidate lines at depths steps corresponding to peaks in OAAIH are candidates to corresponding for inter-tissue boundaries in the ultrasound image. Thus, one may identify as candidate inter-tissue boundary lines the candidate lines that substantially corresponds to intensity peaks in the OAAIH. For example, the candidate lines that correspond to a peak of the OAAIH may be identified as potential candidate inter-tissue boundary lines. Alternatively, the candidate lines substantially coincide with a peak of the OAAIH (i.e. within plus-or-minas 10 depth positions of a peak of the OAAIH) may be identified as candidate inter-tissue boundary lines. In either case, this greatly reduces the number of candidate tissue boundary lines that need to be examined to verify if they do indeed correspond to an inter-tissue boundary in the ultrasound image. The candidate inter-tissue boundary lines may be examined by means of models of inter-tissue boundary lines (such as classifiers) trained to identify instances of inter-tissue boundaries within ultrasound images.

Figure 5:
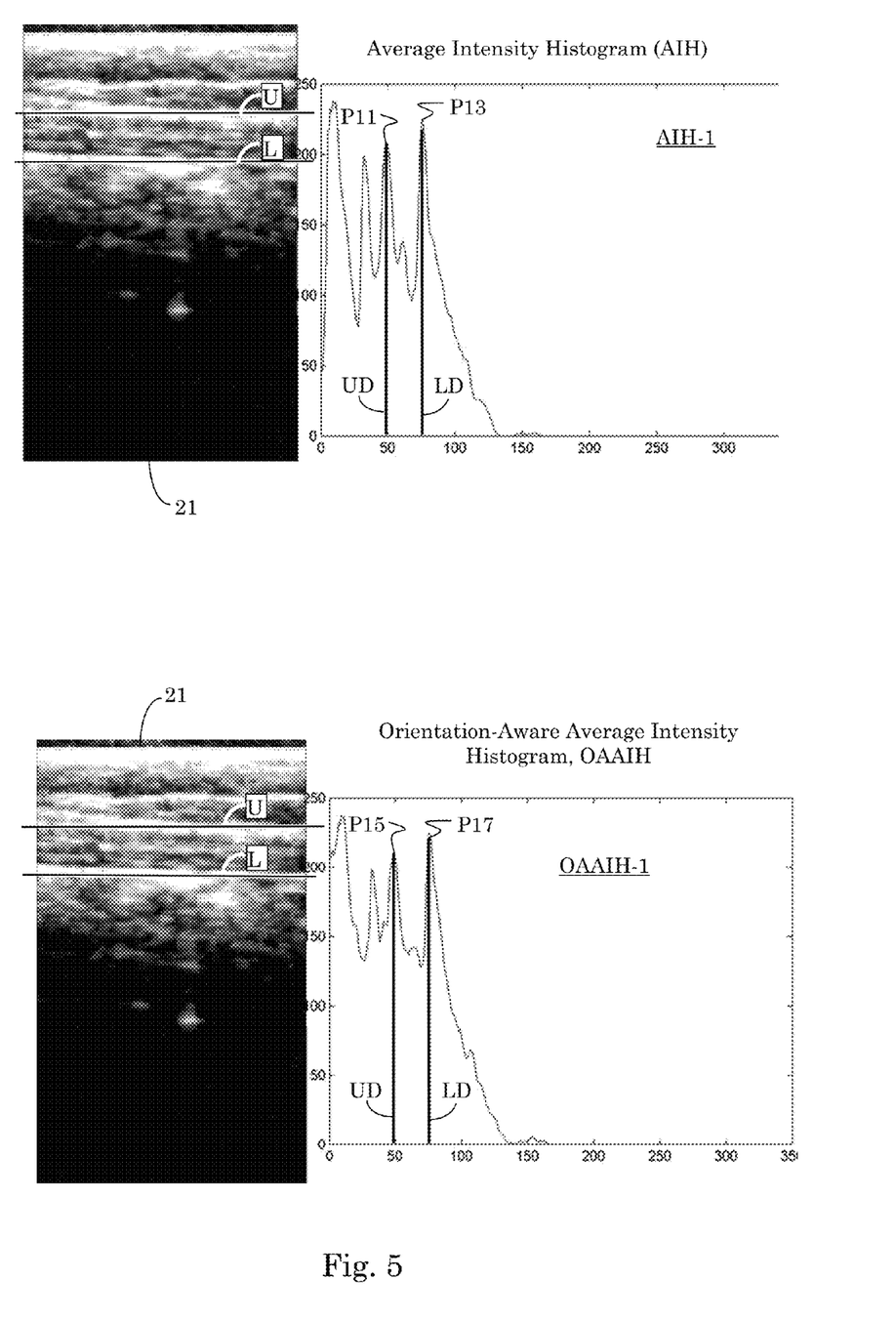
FIG. 5 compares the results achieved with an Average Intensity Histogram, AIH-1, with those achieved with an Orientation-Aware Average Intensity Histogram, OAAIH-1, when the boundary lines in an ultrasound image are substantially horizontal.

FIG. 5 compares an Average Intensity Histogram, AIH-1, with an Orientation-Aware Average Intensity Histogram, OAAIH-1, in accord with the present invention, when the boundary lines of an ultrasound image are substantially horizontal. In the present example, AIH-1 and OAAHI-1 are both constructed from the same ultrasound image 21. In the present example, the boundary lines U and L in ultrasound sound image 21 are both substantially horizontal, so AIH-1 is shown to have its intensity peaks P11 and P13 substantially coincide with the upper depth UD position of boundary line U and the lower depth LD of boundary line L. As shown OAAIH-1 also has its intensity peaks P15 and P17 coincide with depth positions UD and LD, respectively. Thus, both approaches work well when the boundary lines U and L are substantially horizontal.

Figure 6:
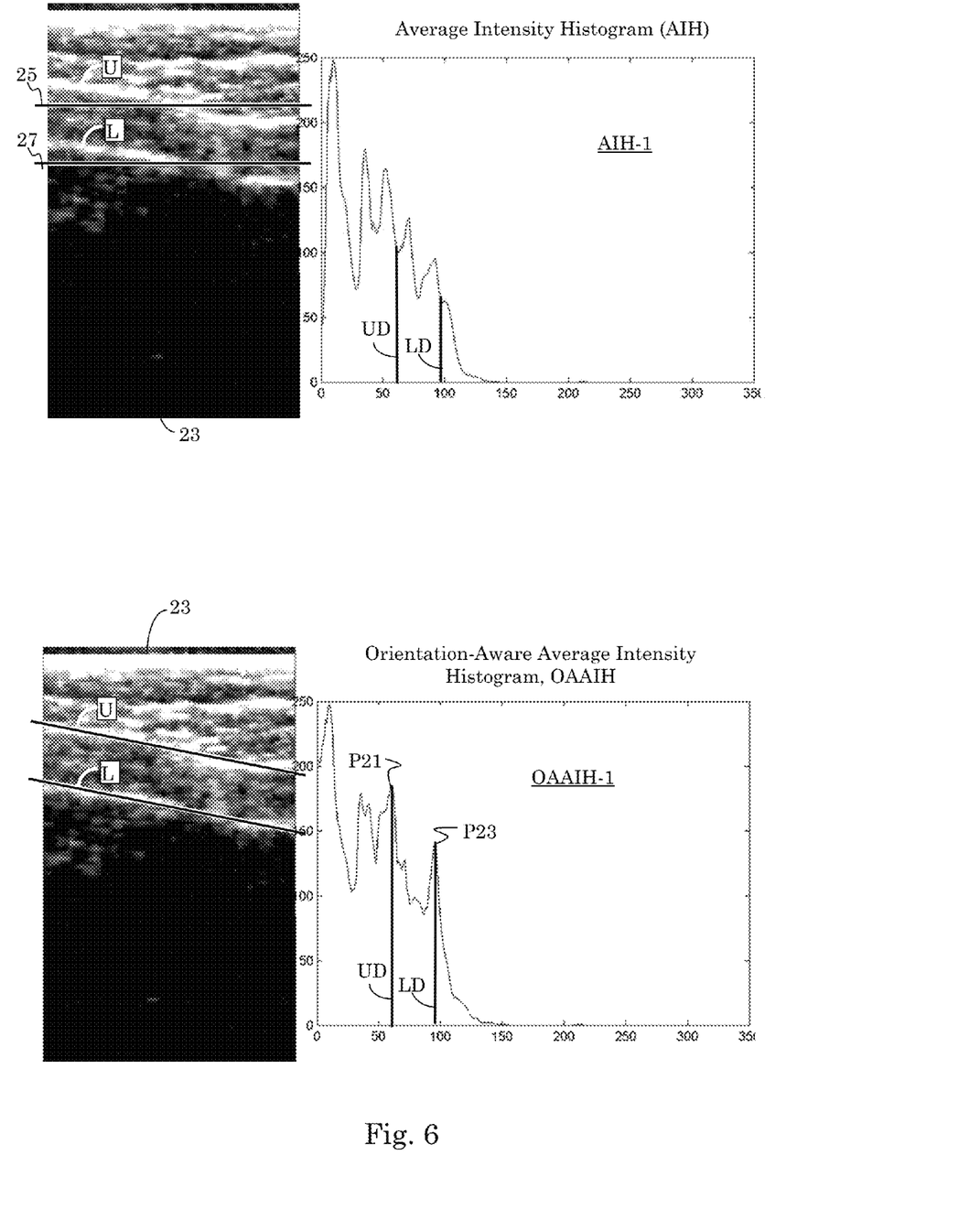
FIG. 6 compares the results achieved with an Average Intensity Histogram, AIH-1, with those achieved with an Orientation-Aware Average Intensity Histogram, OAAIH-1 when the boundary lines in an ultrasound image are not horizontal.

FIG. 6 compares an Average Intensity Histogram, AIH-2, with an Orientation-Aware Average Intensity Histogram, OAAIH-2 when the boundary lines of an ultrasound image are not horizontal. In the present example, AIH-2 and OAAHI-2 are again both constructed from the same ultrasound image 23. In the present example, the boundary lines U and L in ultrasound sound image 23 are both slanted diagonally and curved, as is evident from horizontal upper and lower candidate lines 25 and 27, respectively. Because neither upper boundary line U or lower boundary line L are horizontal, AIH-2 is shown not to be a good indicator of where boundary lines U and L may be located. That is, neither the upper depth UD of upper boundary line U or the lower depth LD of lower boundary line L coincide with an intensity peak of AIH-2. By contrast in OAAIH-2, peak P21 coincides with upper depth position UD and peak P23 coincides with lower depth position LD. Thus, the present OAAIH-2 is a good indicator of boundary lines depth even for non-horizontal boundary lines.

Figure 7:
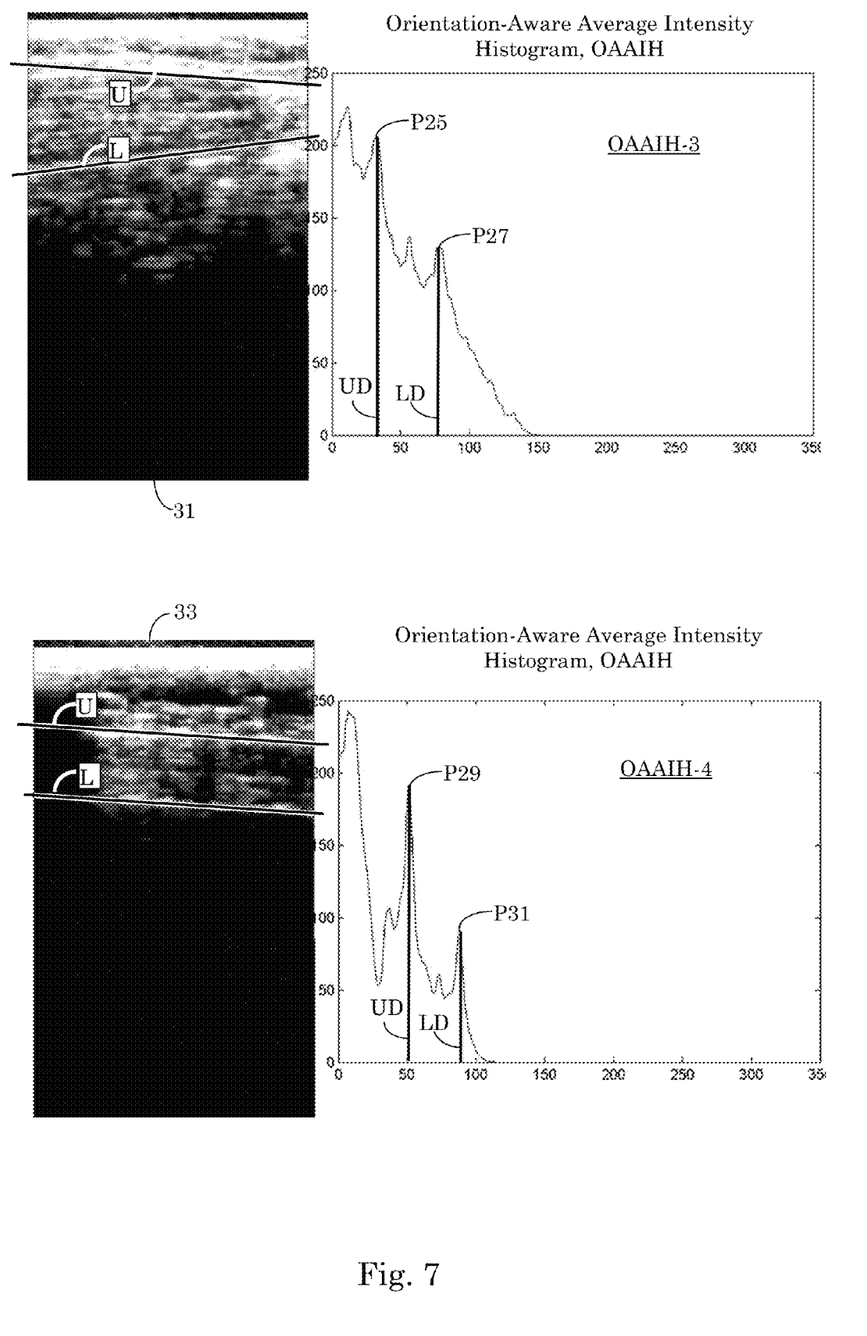
FIG. 7 provides two additional examples of an Orientation-Aware Average Intensity Histogram in accord with the present invention applied to two additional ultrasound image with irregularly shaped boundary lines U and L.

FIG. 7 provides two additional examples of an Orientation-Aware Average Intensity Histogram in accord with the present invention applied to two additional ultrasound image 31 and 33 with irregularly shaped boundary lines U and L. In both case, the intensity peaks the present OAAIH coincide with a depth position of a boundary line. For example, peaks P25 and P27 of OAAIH-3 coincide with upper depth position UD and lower depth position LD, respectively. Similarly, peaks P29 and P31 of OAAIH-4 coincide with upper depth position UD and lower depth position LD.

Figure 8:
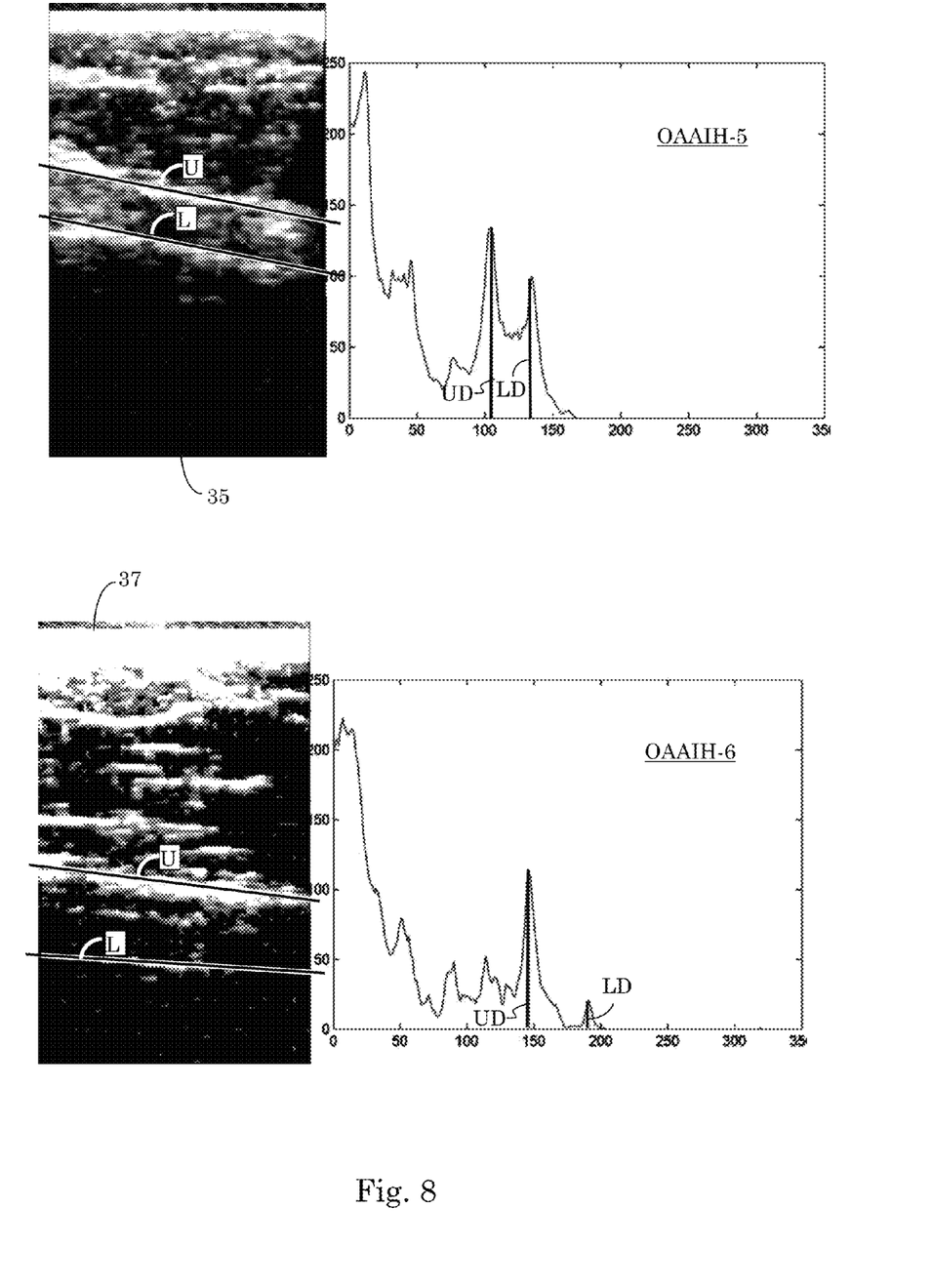
FIG. 8 illustrates two additional examples of Orientation-Aware Average Intensity Histogram in accord with the present invention applied to two additional histogram images.

FIG. 8 illustrates two additional examples of Orientation-Aware Average Intensity Histogram in accord with the present invention applied to two additional histogram images 35 and 37. Again, the peaks of OAAIH-5 coincide with the upper depth position UD of boundary line U and the lower depth position LD of lower boundary line L. Similarly, the peaks of OAAIH-6 coincide with the upper depth position UD of boundary line U and the lower depth position LD of lower boundary line L.

Thus, the peaks of OAAIH indicate the candidate positions of the fat and muscle layer boundaries. This greatly reduces the search space for the fat/muscle layer boundary points from the number of image rows (order of 100's) to the number of OAAIH peaks (order of 1 or at most 10). Finally the slanted (i.e. diagonal) line of pixels in the candidate positions can then be compared to the samples or models of the fat/muscle layer boundary images to identify the fat/muscle boundaries in the testing images. For example, one may use normalized cross-correlation, and/or fitting error with the image model, and/or Rule-based such as declaring Fat to be the brightest peak with certain pre-determined depth range and/or declaring Muscle to be the deepest peak brighter than certain pre-determined threshold.

It is to be understood that the present invention, and its various embodiments, may be implemented in a data processing device and/or computing device having an input to receive the ultrasound image being examined. Thus, the present invention may be implemented using a device having one or more of a: CPU, programmable data processing unit (such as PLD, PLA, FPLA, CPLA, etc.), volatile and non-volatile memory, data and control signal busses, input/output interfaces, displays, registers, etc.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of identifying candidate inter-tissue boundary lines in an ultrasound image, comprising:
   using a data processing device to implement the following steps:
   accessing an input ultrasound image, said input ultrasound image including rows and columns of pixels;
   identifying candidate boundary lines by:
   (a) dividing said input ultrasound image into discrete, sequential depth positions, each discrete depth position being defined by a fixed number of rows of pixels;
   (b) defining a plurality of horizontal band regions, each horizontal band region corresponding to a separate one of said discrete depth positions and fully encompassing its corresponding depth position, each horizontal band region spanning a plurality of sequential depth positions;
   (c) progressing, one discrete depth position at a time, along said input ultrasound image, and at each, current, depth position executing the following steps:
   (i) defining a plurality of potential boundary lines within the current horizontal band region that corresponds to the current depth position, each of the defined potential boundary lines traversing a common point within the current horizontal band at a different angle relative to the horizontal;
   (ii) defining a candidate band region corresponding to each potential boundary line following the trajectory of its corresponding boundary line and encompassing its corresponding boundary line;
   (iii) determining an intensity value for each potential boundary line based at least in part on the intensity of pixels within its corresponding candidate boundary region;
   (iv) recording the potential boundary line of highest intensity value as the candidate line for the current depth position;
   (d) collecting the intensity values of candidate lines recorded at the different depth positions into an intensity-depth histogram;
   (e) identifying as said candidate inter-tissue boundary lines the candidate lines that substantially correspond to peaks in said intensity-depth histogram.

2. The method of claim 1, wherein in step (a), each discrete depth position is comprised of one row of pixels.

3. The method of claim 1, wherein in step (b), the depth position of each horizontal band defines the middle of the horizontal band.

4. The method of claim 1, wherein in step (c), the progression of discrete depth positions is along one column of pixels of said input ultrasound image.

5. The method of claim 4, wherein in step (i), said common point is a pixel on said one column.

6. The method of claim 5, wherein said one column is the middle column of said input ultrasound image.

7. The method of claim 1, wherein in step (i), each of said potential boundary lines is a straight line.

8. The method of claim 1, wherein in step (i), said common point is the center of the current horizontal band.

9. The method of claim 1, wherein in step (ii), the length of each candidate band is defined by the length of its corresponding potential boundary line to traverse from one side of the current horizontal band to its opposing side, and the width of each candidate band is defined by the pixel-width of its corresponding potential boundary line.

10. The method of claim 9, wherein the one side and its opposing side are opposite sides along the horizontal direction of the horizontal band.

11. The method of claim 9, wherein in step (iii), the intensity value for each potential boundary line is determined by the average intensity of the pixels along the boundary line.

12. The method of claim 11, wherein in step (iii), wherein the intensity value for each potential boundary line is further weighted by the cosine of the angle of the potential boundary line relative to the horizontal direction defined by the horizontal band.

13. The method of claim 1, wherein in step (ii), the length of each candidate band is defined by the length of its corresponding potential boundary line to traverse from one side of the current horizontal band to its opposing side, and the width of each candidate band is multiple times the pixel-width of its corresponding potential boundary line.

14. The method of claim 13, wherein in step (ii), each potential boundary line bisects its corresponding candidate band region into two equal parts.

15. The method of claim 13, wherein in step (iii), the intensity value for each potential boundary line is determined by the mean of the pixel intensities within its corresponding candidate band.

16. The method of claim 15, wherein in step (iii), the intensity value of each potential boundary line is further determined by the variance of the pixel intensities within its corresponding candidate band.

17. The method of claim 16, wherein identified outliers in the distribution of mean and variance values are not considered.

18. The method of claim 15, wherein in step (iii), when calculating the mean intensity of the pixel intensities within its corresponding candidate band, the intensity of each pixel is weighted by its distance to the candidate band's corresponding potential boundary line, where the farther the distance of a pixel to the potential boundary line, the smaller its weight.

19. The method of claim 18, wherein the weight is defined as:

$$Weight = e^{(-d^2/sigma^2)};$$

where "d" is the respective pixel's distance to the corresponding potential boundary line, and "sigma" is defined by the distribution of mean values.

20. The method of claim 18, wherein the weighted mean intensity is again weighted by the cosine of angle θ of the candidate band relative to the horizontal direction of the horizontal band.

* * * * *